United States Patent Office 3,296,208
Patented Jan. 3, 1967

3,296,208
HYDANTOIN PRODUCTS AND PROCESSES FOR
THE PREPARATION THEREOF
Arthur O. Rogers, Lewiston, N.Y., assignor to E. I. du
Pont de Nemours and Company, Wilmington, Del., a
corporation of Delaware
No Drawing. Filed Feb. 8, 1963, Ser. No. 257,080
13 Claims. (Cl. 260—67.5)

This invention relates to a novel class of nitrogen-containing condensation polymers, and for processes for their preparation. More particularly, this invention relates to a novel class of nitrogen-containing condensation polymers having heterocyclic hydantoin nuclei as recurring structural units in the polymeric chain.

It is an object of this invention to provide a new class of linear nitrogen-containing condensation polymers characterized by the presence of hydantoin nuclei as recurring units in a novel arrangement within the polymeric chain, whereby these polymers are water-insoluble and, according to their degree of polymerization and inherent viscosity, are useful in the preparation of adhesives, as materials for forming tough, pliable shaped bodies, or as intermediates for preparing higher molecular weight homopolymers or copolymers.

Another object is to prepare novel bis-hydantoin compounds adapted to serve as intermediates for the aforementioned polymers.

A further object, again, is to provide processes for the preparation of intermediates and linear condensation polymers as aforesaid.

A still further object is to provide shaped articles comprising such polymers, particularly fibers, films, and other articles for which linear condensation polymers are particularly adapted.

Other objects and achievements will be apparent from the following specification and claims.

Hydantoins are compounds having the general formula

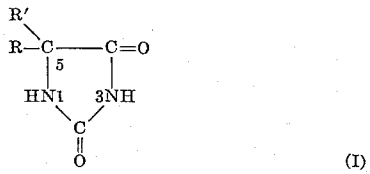

(I)

wherein R and R' may be hydrocarbon or other substituents as more fully illustrated in the discussion below, and wherein the ring positions are generally numbered as above indicated.

In U.S. Patents 2,417,999 and 2,418,000 (Walker), monomeric N,N'-methylene bis-hydantoins are described, which are prepared by reacting hydantoin with formaldehyde, in essentially 2:1 mole ratio, in an acid aqueous medium. The products obtained in these patents may be represented by the formula

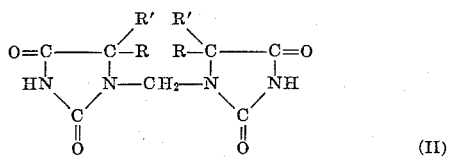

(II)

and may be designated as methylene 1,1'-bis-hydantoin compounds. They are clearly not polymeric.

In U.S.P. 2,155,863 (Jacobson), water-soluble synthetic resins are prepared by reacting 5,5-dimethyl hydantoin with a large excess of formaldehyde (5 moles of the former to 18 moles of the latter), in aqueous medium which is at first kept alkaline at reflux temperature and is then acidified with continued heating.

The process of the Jacobson patent is improved in U.S.P. 2,532,278 (Chadwick) and the theory is advanced there that the mechanism of resin formation probably takes place in two reactions. First, formaldehyde and the hydantoin react to form a methylol hydantoin. This compound then condenses with itself with the elimination of water to yield the resin.

Interpreted by the aid of formulas, Chadwick's study of the mechanism taken together with the formulas set forth by Walker, indicates the formation first of a monomeric compound of the formula

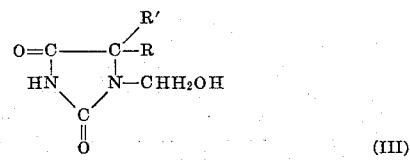

(III)

which, in the subsequent reaction, forms a polymer having in its structure a chain of the form

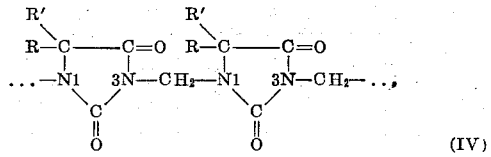

(IV)

This may be designated as a 3,1 hook-up for the methylene link, or, less formally, a head-to-tail hook-up. Furthermore, the link between any two successive hydantoin rings is the same throughout the molecule, i.e. the methylene group $CH_2$. As already noted, the resinous products are mostly water-soluble.

Moreover, by actual experiment and measurements, I have found that the reaction products obtainable according to Jacobson and Chadwick have an inherent viscosity which does not significantly rise, no matter to what temperature or to what length of time the product is heated. The inherent viscosities of the reaction products producible according to these patents have been found by me to be initially of a relatively low order, say in the range of 0.02 to 0.03, and in further heating of these compounds, whether by the methods set forth in the patents or those used in this specification hereinbelow, I have never succeeded in raising this viscosity beyond about 0.05. I have found the above statement to be true even where the initial reaction product of one or the other of these patentees has been heated sufficiently to convert it into a water-insoluble resin.

I have now found that hydantoin polymers in which any two adjacent hydantoin rings are arranged in mirror-image relation, in other words, hydantoin polymers having successively a head-to-head and tail-to-tail hook-up, possess the valuable property of insolubility in water and, accordingly, are suitable for use as adhesives when their viscosity is low and as materials for forming shaped bodies (such as fibers and films) when their viscosity is high. Moreover, the polymers of relatively low molecular weight are in this case convertible into higher polymers or copolymers (in other words, products of higher inherent viscosities) by heating with an acid catalyst as more fully set forth hereinbelow.

Accordingly, this invention embraces first of all a novel class of nitrogen-containing condensation polymers characterized by the presence of recurring structural units of the following type:

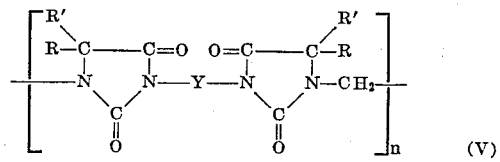

wherein R and R' are alike or different and are chosen from the group consisting of monovalent hydrocarbon radicals, and monovalent radicals comprising ether, thioether, nitrile, tertiary amide or ester radicals or any other radical which is not reactive toward formaldehyde in the presence of an acid catalyst, or R and R' together constitute a divalent radical containing four or five atoms which, together with the "5" carbon atom of the hydantoin nucleus, constitute a homocyclic or heterocyclic structure as exemplified hereinbelow; Y is a divalent organic radical of the aliphatic, alicyclic or aromatic type which may additionally contain, as intralinear groups or as extralinear substituents, cyclic structures or hetero atoms which are not reactive under the conditions of condensation; and n is an integer greater than 1.

Further in accordance with the objects of this invention, there is provided a process for the preparation of polymers of the type described above which comprises the condensation of a hydantoin with formaldehyde, followed by condensation of the resulting 1,1'-methylene bis-hydantoin with a dihalo compound, wherein both halogen atoms are attached to aliphatic carbon atoms. Alternatively, and preferably when the higher molecular weights are desired, the polymers may be prepared by effecting the above condensation in reverse order, i.e., by first reacting the dihalo compound with the hydantoin and subsequently reacting the 3,3'-bis-hydantoin product of this reaction with formaldehyde. Each of the above steps may be effected in the presence of a suitable solvent or solvent system, and it is normally desirable to effect the last stages of polymerization to a high molecular weight product by heating in the absence of solvents or diluents.

The mirror-image symmetry of the product results from the difference in chemical reactivity of the two N-atoms in the hydantoin nucleus. Thus, the reaction with formaldehyde occurs preferentially at the amido nitrogen atom (position 1), while condensation with the dihalo compound is specific to the imido nitrogen (position 3). The products, accordingly, may be restated as being characterized by a successively alternating 3,3' and 1,1' hook-up. It will be noted furthermore that except in the single case where Y represents $CH_2$, the links between adjacent hydantoin rings are successively alternating in nature, one of them nevertheless being $CH_2$ in all the compounds of this invention.

The terminal groups of the polymer will of course be different in the two sequences of synthesis-process above set forth, but they will be in any event hydantoin radicals having an H or $CH_2OH$ on the 1-N-atom and an H or Y–X radical (as above defined) on the 3-N-atom, but except in cases where n is a very small number, this slight difference in the terminal radicals does not affect materially the physical or utilitarian characteristics of the polymer.

Among operable hydantoins which are useful in the preparation of the polymers of this invention are those which have the structure:

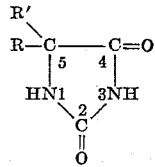

wherein R and R' are radicals of the types discussed under Formula V and more particularly exemplified by the following:

(1) Compounds wherein both R and R' represent monovalent radicals, said radicals being of the same or different types. Illustrative of this group are: 5,5-dimethylhydantoin, 5,5-diethylhydantoin, 5,5-dipropylhydantoin, 5,5-diphenylhydantoin, 5-methyl-5-ethylhydantoin, 5-methyl-5-propylhydantoin, 5-methyl-5-isopropylhydantoin, 5-methyl-5-butylhydantoin, 5-methyl-5-isobutylhydantoin, 5-ethyl-5-propylhydantoin, 5-ethyl-5-isopropylhydantoin, 5-ethyl-5-butylhydantoin, 5-ethyl-5-isobutylhydantoin, 5-propyl-5-isopropylhydantoin, 5-propyl-5-butylhydantoin, 5-propyl-5-isobutylhydantoin, 5-isopropyl-5-butylhydantoin, 5-isopropyl-5-isobutylhydantoin, 5-butyl-5-isobutylhydantoin, and the like.

(2) Compounds wherein R and R' together constitute a divalent organic radical which, together with the carbon atom of the hydantoin nucleus to which R and R' are attached (designated as carbon number 5 in the preceding structural formula), forms a homocyclic or heterocyclic group. For this latter purpose, the combined R and R' should contain four or five atoms in a chain so that a five- or six-membered cyclic group is formed, as is illustrated by 5,5-pentamethylenehydantoin, 5,5-tetramethylenehydantoin, and the like.

Moreover, the choice of R and R' need not be limited to hydrocarbon radicals, but may include radicals of a polar nature, for instance such as are or include in their structure ethers, thioethers, nitriles, tertiary amines, disubstituted amides, esters, and other non-reactive radicals as hereinabove set forth. Illustrative of such values of R and R' are ethoxy, methoxymethyl, furyl, cyanoethyl, N,N-dimethylformamyl, methylformyl, and the like. More specifically, hydantoins having polar values of R and R' may be illustrated by 5-methyl-5-[(ethylthio)methyl]hydantoin, 5-methyl-5-(2-thienyl)hydantoin, 5-(2-dimethylaminoethyl)-5-methyl-hydantoin, 5-ethoxymethyl-5-propyl hydantoin, methyl 5-(5-methyl-hydantoin) propionate, 5-methyl-5-(2-tetrahydrofuryl)hydantoin, 5-ethylthio-5-phenyl hydantoin, 5-methyl-5-[(ethylsulfinyl)methyl]-hydantoin, 5,5-di-2-pyridyl-hydantoin, 5-methyl-5-cyanoethylhydantoin, dimethyl 5-hydantoin propionamide, and the like.

5,5-dimethylhydantoin is the preferred hydantoin for preparation of high-molecular-weight linear polymers. The symmetrical substitution leads to desirable polymer properties and protects the 5-positions during the condensation reactions, and the relatively small size of the methyl group offers little steric hindrance to the coupling reaction required for attainment of high molecular weight.

The requisite hydantoins of the above types are themselves readily prepared from the appropriate aldehydes or ketones by reaction in an aqueous medium containing cyanide ions, ammonium ions, and carbonate ions. The choice of the appropriate aldehyde or ketone to be utilized in the preparation of the desired hydantoin may be made with reference to the following equation:

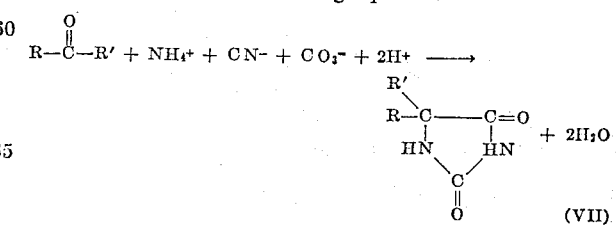

This procedure is well known, and may be utilized in the preparation of hydantoins having a wide variety of substituents at the 5-position of the hydantoin nucleus. Experimental details are readily available in the published literature e.g., Allen and Henze, J. Am. Chem. Soc. 60, 1796 (1938) or Bucherer & Lieb, J. Prakt. Chem. 141, 5 (1934).

The dihalo compounds which are of utility in the preparation of the polymers of this invention may be any organic dihalogen compounds which do not contain any additional substituents (other than the named two halogen atoms) that would tend to react with one or the other of the NH groups of the hydantoin nucleus, and which, preferably, are also free of substituents that would tend to condense with formaldehyde.

More particularly, the desirable dihalo compounds may be defined as members of the group consisting of
(A) The compounds embraced by the three formulas

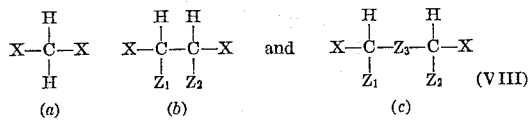

wherein X is a halogen, preferably chlorine, bromine or iodine; $Z_1$ and $Z_2$ are members of the group consisting of hydrogen and monovalent organic radicals which are free of substituents, such as aliphatic halogen, that are reactive toward hydantoin-ring nitrogen, and are also free of substituents and structures, such as OH or aliphatic double bonds, that would cause condensation with formaldehyde, while $Z_3$ is a divalent organic radical which is likewise free of reactive substituents and structures as aforementioned.

(B) The compounds embraced by Formulas b and c above but wherein $Z_1$ and $Z_2$ jointly represent a divalent organic radical which is free of reactive substituents and structures as aforementioned.

The simplest values of organic radicals satisfying the above conditions for $Z_1$, $Z_2$ and $Z_3$ are, of course, hydrocarbon radicals (aliphatic, cycloaliphatic or aromatic), and accordingly dihalo compounds as above defined except that the entire radical between the two X's is a hydrocarbon radical of 1 to 12 C-atoms, constitute a preferred subclass of initial materials for the purposes of this invention. Again, where the object is to make fiber-forming polymers, the most desirable dihalo compounds are α,ω-polymethylene dihalides of 2 to 6 C-atoms, in other words, compounds of the formula:

$X—(CH_2)_n—X$, wherein $n$ is an integer from 2 to 6 inclusive.

The following listing of exemplary dihalo compounds names only dichloro compounds, but it is to be understood that the dibromo and diiodo compounds are included, as well as those in which more than one type of halogen is present, as the chloro-bromo, bromo-iodo, and chloro-iodo analogs. Among operable reactants of the dihalo type may be named dichloromethane, 1,2-dichloroethane, 1,3-dichloropropane, 1,4-dichlorobutane, 1,5-dichloropentane, and other members of this homologous series; the branched chain dihalo compounds as 1,2-dichloropropane, 1,3-dichlorobutane, 2-methyl-1,3-dichloropropane, 2,2-dimethyl-1,3-dichloropropane, 2,5-dimethyl-1,6-dichlorohexane, 3 - ethyl - 1,5 - dichloropentane, and other branched dihalo compounds. Additionally, those dihalo compounds which contain cyclic structures may be utilized, whether such cyclic structures are present as intralinear groups as in 1,4-, 1,3- or 1,2-dichlorocyclohexane, 1,2-dichlorocyclopropane, 1,4-bis-chloromethylcyclohexane, 1,3 - bis(chloromethyl)benzene, 1,4 - bis-(chloromethyl)benzene, 1,3 - bis(2-chloroethyl)benzene, 1,4 - bis(2 - chloroethyl)benzene, 1,3 - bis(chloromethyl) naphthalene, 2,6 - bis(chloromethyl)naphthalene, and other similar compositions containing one or more cyclic structures, or whether such cyclic structures are present as extralinear substituents, as 2-phenyl-1,3-dichloropropane, 3-phenyl-1,5-dichloropentane, 2-cyclohexyl-1,3-dichloropropane, 2-cyclopentyl-1,4-dichlorobutane, and the like. Another class of dihalo compounds which may be utilized in the practice of this invention encompasses those which contain hetero atoms, as typified by 2,2'-dichlorodiethyl ether, 4,4'-dichlorodibutyl ether, 4,4'-bis(chloromethyl)diphenyl ether, 2,2'-dichlorodiethyl thioether, 4,4'-bis(chloromethyl)diphenyl sulfide, 2,2'-dichlorodiethyl sulfone, 2,2'-dichlorodiethyl sulfoxide, N,N-bis(2-chloroethyl)phenylamine, di(2-chloroethyl) acetamide, 2-chloroethyl chloroacetate, 2-chloroethyl chlorothioacetate, 2-chloroethyl chlorodithioacetate, di(2-chloroethyl) thioacetamide, 1,3-dichloro-2-cyanopropane, 1,4-dichloroethyl 2-nitrobenzene, 3,4-dichloromethyl thiophene, 2,5-dichloromethyl pyridine, 3,4-dichlorotetrahydrofuran, 2,3-dichlorotetrahydrothiopene, 3,4-dichloro N-methylpyrrolidine, and the like.

It will be recalled that, while each of the above compounds is named as a dichloro composition, the use of other halogen atoms to replace chlorine is included within the inventive concept. The above listing of operable compounds is not intended, therefore, to be limiting, but to be illustrative of the wide variety of dihalo compounds which may be satisfactorily employed.

The preferred high molecular weight polymers of this invention are those for which $n$ is large enough that the inherent viscosity, as hereinafter defined, is greater than 1.0. Such polymers are suitable for structural uses such as formation of fibers and films. Those polymers having lower values of $n$ are useful as adhesives, impregnants for porous materials such as textiles or wood, and the like, and they are further useful as reactive prepolymer intermediates in the preparation of higher molecular weight hydantoin homopolymers or block condensation copolymers. Of particular interest in this latter connection are polymers having an inherent viscosity in the range of 0.03 to 0.10.

In the aforementioned procedure of synthesis wherein the hydantoin compound is first condensed with formaldehyde and then with a dihalo compound, the first step is aimed at producing a 1,1'-methylene bis-hydantoin monomer, and the procedure follows in general outline that of the two aforementioned Walker patents. The second step is aimed at producing the linear condensation polymer. This is produced by condensing in the presence of an acid acceptor (a) 1,1'-methylene bis-hydantoin monomer of the formula

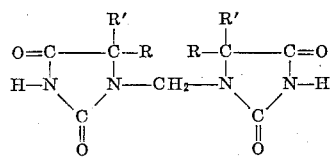

wherein R and R' are as previously defined with (b) a dihalogen compound of the formula $X_1$—Y—$X_2$ wherein Y is as previously defined and $X_1$ and $X_2$ are halogens selected from the group consisting of chlorine, bromine and iodine. The 1,1'-methylene bis-hydantoin may suitably be 1,1'-methylene-bis(5,5-dimethyl-hydantoin) and the dihalogen compound may suitably be 1,4-dichlorobutane.

In the alternate (and preferred) procedure of this invention, wherein the selected hydantoin is first condensed with a dihalo compound and then followed by condensation with formaldehyde, the reaction for the first step may be expressed by the following equation:

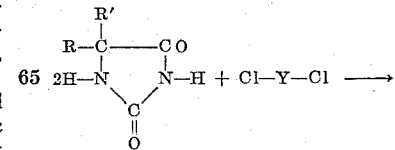

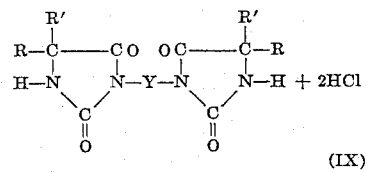

(IX)

wherein R, R' and Y have the values hereinabove indicated. The reaction is normally conducted in the presence of a suitable solvent medium, and with the aid of an acid acceptor. It is also possible to first treat the hydantoin with a base (e.g. $K_2CO_3$), forming a salt at the 3-position, and then couple pairs of such molecules by treatment with the dihalo compound.

It will be noted from the above equation, that two moles of the hydantoin and a quantity of acid acceptor sufficient to neutralize two moles of HCl are required for each mole of dihalo compound. In practice, however, use of a slight excess of the acid acceptor is recommended.

Suitable solvent media for this reaction include water, N,N - dimethylformamide, N,N - dimethylacetamide, dimethylsulfoxide, ethylene glycol monomethyl ether, ethanol, methanol, tetrahydrofurfuryl alcohol, and, in general, those non-acidic organic solvent materials which are polar in nature, which serve as at least partial solvents for the organic reactants and products of this reaction, which are non-reactive with the components of the reaction mixture under the conditions of condensation, and which are liquids under the conditions of reaction. Among suitable acid acceptors may be named potassium carbonate, sodium carbonate, calcium hydroxide, sodium hydroxide, quaternary ammonium ion exchange resins, and the like.

The reaction is effected by maintaining the mixture at a temperature within the range of from about 50° C. to 200° C. for a period of time of from about 1 hour to about 30 or more hours, and preferably at a temperature within the range of from about 110° C. to about 175° C. for a period of time of from about 1 hour to about 4 hours, or until the conversion of organic halogen to halide ion is substantially complete. The organic product is isolated by precipitation with a non-solvent, or by other conventional means such as crystalization or evaporation.

The second step of the above alternate procedure may now again take two optional routes:

(1) *Single-step, acid route.*—The reaction product of Equation IX is reacted with paraformaldehyde in a strongly acidic aqueous medium, preferably concentrated hydrochloric acid or concentrated sulfuric acid, although phosphoric acid, p toluenesulfonic acid, and other acids are also applicable. A slight excess over 1 mole of $CH_2O$ per mole of said reaction product is sufficient for reaction in this route. The condensation will proceed at room temperature or below if the reaction mass is held for several hours or overnight. In some cases, for instance when concentrated HCl is the liquid medium, the reaction mass may be heated to as high as 90° or 100° C., with a corresponding shortening of the reaction period. The resulting low polymer is isolated by precipitation with water followed by filtration.

The material is then heated at a temperature within the range of 110° to 300° C., and preferably in the range of 150° to 260° C., preferably at a pressure of about 0.05 mm. to about 30 mm. and in the presence of an acid catalyst, by which it is converted to a high polymer.

Reaction by melting the condensation product of equation IX above with a fusible form of formaldehyde (e.g. paraformaldehyde) in the absence of a diluent but in the presence of a fusible acid catalyst (say, p-toluenesulfonic acid) is also possible. (See Example IV–D below.) The reaction mass is then dissolved in acetone, reprecipitated by dilution with water and filtered off.

(2) *Formation and isolation of an intermediate dimethylol monomer.*—In this route two moles of formaldehyde are theoretically required for each mole of the reaction product of Equation IX and the condensation is effected in two steps of which the first is done in the presence of a basic catalyst and the second one is assisted by an acid catalyst. The theory of this route is indicated by the following equations:

(a)

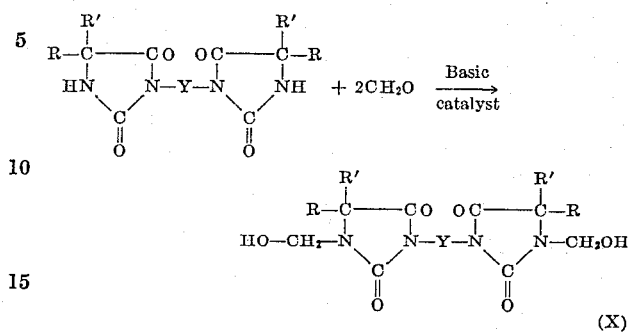

(b) In the presence of an acid catalyst and at higher temperatures, two or more molecules of X condense successively with elimination of one $CH_2O$ and one $H_2O$ molecule at each point of juncture to give a polymer whose repeating unit is of Form V hereinabove.

More particularly:

*Step (a).*—One mole of the bishydantoin resulting from the reaction indicated in Equation IX is mixed with two (or slightly more than two) moles of formaldehyde in aqueous solution, in the presence of a catalytic quantity of sodium tetraborate decahydrate or other suitable basic compound. Heating of the reaction mixture at a temperature of from about 50° C. to about 90° C. for a period of from about 30 minutes to about 1 hour results in the formation of the dimethylol compound. This material is purified by recrystallization from water, following which it is filtered and dried.

*Step (b).*—Polymerization to high molecular weight may be effected by heating with an acid catalyst. Such polymerization is normally carried out by adding the acid catalyst to a melt of the dimethylol compound, then maintaining the molten mixture at a temperature within the range of 160° to 260° C., preferably 200° to 250° C., for a period of between about 15 minutes and 1 hour. Suitable acid catalysts include potassium pyrosulfate, p-toluenesulfonic acid, sulfuric acid, phosphoric acid, an acidic ion exchange resin, and the like. Further polymerization results when the mixture is maintained at an elevated temperature, preferably between 235° C. and 260° C. and a pressure of between 0.05 mm. and 30 mm. for a period of between about 1½ hours and 3 hours. Purification of the polymer may be readily effected by dissolving it in a suitable solvent (e.g., methylene chloride) and precipitating with a non-solvent (e.g., methanol) in a blendor. Polymers having interent viscosities of up to 1.5 or higher may be prepared by the procedures outlined above.

Fibers and films of the polymers of this invention may be prepared by standard techniques, either from the melt or from solution in suitable solvents. Such shaped articles may be drawn and oriented by conventional procedures, producing films and fibers of utility in numerous applications.

The following examples illustrate the present invention, but are not to be considered as limiting in any way. Parts mentioned therein are parts by weight.

In these examples, inherent viscosities ($\eta$inh) are determined in accordance with the following formula:

$$\eta_{inh} = \frac{\ln \eta_{rel}}{C}$$

The relative viscosity ($\eta$rel) is determined by dividing the flow time in a capillary viscometer of a dilute solution of the polymer by the flow time for the pure solvent. The concentration C is 0.5 gram of polymer per 100 ml. of solution, and the measurements are made at 30° C. Unless otherwise specified, inherent viscosities are determined in chloroform.

EXAMPLE I

3,3'-methylene-bis(5,5-dimethylhydantoin) and its polymers

*Reaction A.*—5,5-dimethylhydantoin (1.0 mols, 128 parts), potassium carbonate (0.52 mole, 72.0 parts), methylene chloride (0.50 mole, 42.5 parts) and N,N-dimethylformamide (480 parts) are heated together with stirring under a water-cooled reflux condenser surmounted by a Dry Ice-methanol-cooled reflux condenser. The temperature at which refluxing occurred rises gradually from 123° C. to 144° C. over a period of 2½ hours, at which point the reaction is terminated. The reaction mixture is mixed with about 1.4 liters of water and stirred overnight to crystallize the product. The latter is filtered off, washed with water and dried. The filtrate and washings are found to contain 93.6% of the theoretical chloride ion. After recrystallization from water, the product melts at 292–296° C. It constitutes 3,3'-methylene-bis (5,5-dimethylhydantoin) of the formula

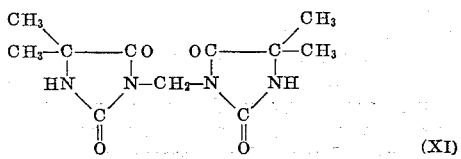
(XI)

*Reaction B.*—5.4 parts of the product from Reaction A (0.020 mole) and 0.66 parts of paraformaldehyde (0.022 mole $CH_2O$) are mixed in a test tube. Concentrated hydrochloric acid (6 parts) is added; the mixture is stirred until uniform and then shaken overnight at room temperature. The resulting viscous solution is heated in a water bath at 100° C. for three hours, during which time it sets to a solid cake. This is dispersed in water, filtered and washed until the washings are neutral and free of chloride ion. The solid product, after drying, melts gradually at 220–304° C. and has an inherent viscosity of 0.047. It is insoluble in water but soluble in methylene chloride and in chloroform. The product is obviously a low polycondensation product of 3,3'-methylene-bis (5,5-dimethylhydantoin) and formaldehyde.

*Reaction C.*—One part of the low polymer obtained in Reaction B is dissolved in 6.7 parts of methylene chloride. 0.0029 parts of p-toluenesulfonic acid is dissolved in a little methanol and added to the solution, which is then evaporated rapidly to dryness under vacuum, using a rotary evaporator and heating in a boiling water bath. The residue is heated under vacuum (ca. 1 mm.) in a salt bath over a period of 2½ hours, during which time the bath temperature rises gradually from 183° to 255° C. The product is a brownish, glassy resin which melts at approx. 270° C. and has an inherent viscosity of 0.26. It is insoluble in water, but soluble in methylene chloride and in chloroform. This product is obviously a high polycondensation product of 3,3'-methylene-bis(5,5-dimethylhydantoin) and formaldehyde.

EXAMPLE II

This example illustrates methods of preparing various 3,3'-tetramethylene-bis(dialkylhydantoins).

(A) *Organic solvent.*—To a reaction vessel equipped with a reflux condenser are added 512 parts (4.0 moles) of 5,5-dimethylhydantoin, 288 parts (2.1 moles) of potassium carbonate, and 1240 parts of N,N-dimethylformamide. The mixture is heated to the temperature of reflux and maintained at that temperature for a period of two hours, following which it is permitted to cool to room temperature. 1,4-dichlorobutane, in the amount of 254.4 parts (2.0 moles), is added, and the mixture is maintained at the temperature of reflux for an additional 2½ hours. When the mixture has cooled to room temperature, it is filtered to remove solid potassium chloride, the solid is washed with N,N-dimethylformamide, and the filtrate and washings are combined. The yield of potassium chloride is found, after drying, to be nearly quantitative. The N,N-dimethylformamide solution containing the product is poured into three times its volume of cold water with stirring, and the product crystallizes over ½ hour. The product is isolated by filtration, and is washed with additional cold water. It is purified by recrystallization from hot water to produce colorless crystals of 3,3'-tetramethylene-bis(5,5-dimethylhydantoin) which exhibit a melting range of 197–203° C.

(B) *Aqueous solvent.*—25.6 parts of 5,5-dimethylhydantoin (0.20 mole), 12.7 parts of 1,4-dichlorobutane (0.10 mole), and 4 parts of sodium hydroxide (0.1 mole) are added to 300 parts of water. The mixture is heated and refluxed for 6 hours, with rapid stirring. A second 0.1 mole portion of sodium hydroxide is added and the treatment continued to a total reaction period of 24 hours. When the mixture has cooled, a white crystalline precipitate of 3,3'-tetramethylene-bis(5,5-dimethylhydantoin) forms, which is filtered off, washed and dried.

(C) *Other choices for R and R'.*—28.4 parts of 5-ethyl-5-methylhydantoin (0.20 mole), 14.3 parts of potassium carbonate (0.104 mole) and 12.7 parts of 1,4-dichlorobutane (0.10 mole) are added to 143 parts of N,N-dimethylformamide and heated under reflux at 120° C. for 4 hours with stirring. The mixture is poured into 400 parts of water, stirred for an hour and filtered. The cake is washed free of chloride ion and dried to constant weight.

The product, 3,3'-tetramethylene-bis(5-ethyl-5-methylhydantoin) is a pure white crystalline powder, melting point 164–170° C., after recrystallization from water.

(D) In a similar manner, 5-isobutyl-5-methylhydantoin may be reacted with 1,4-dichlorobutane in boiling ethylene glycol monomethyl ether containing sodium carbonate to yield 3,3'-tetramethylene-bis(5-isobutyl-5-methylhydantoin), melting point 177° C.

EXAMPLE III

This example illustrates different choices for Y in the reactions on Example II.

(A) 9.35 parts of bis-(2-chloroethoxy)-ethane (0.050 mole), 12.8 parts of 5,5-dimethylhydantoin (0.10 mole) and 15.2 parts of potassium carbonate (0.11 mole) are mixed with 95 parts of N,N-dimethylformamide in a 3-necked flask fitted with stirrer, thermometer, reflux condenser and heating mantle. The stirred mixture is heated to 118° C. over a period of 3 hours 20 minutes and held at 118–121° C. for 3 hours. The hot solution is filtered and the filtrate is evaporated under vacuum from a boiling water bath to yield a viscous liquid residue which crystallizes readily when seeded. The product is very soluble in water, methanol, chloroform and hot n-propyl alcohol; it is moderately soluble in acetone, slightly soluble in cold n-propyl alcohol and insoluble in carbon tetrachloride. After recrystallization from n-propyl alcohol, it weighs 14.35 parts (77.7%) and melts at 117–122° C.

*Analysis.*—Found, C = 51.86%; H = 7.09%; N = 15.42%. Calc. for $C_{16}H_{26}N_4O_6$: C = 51.9%; H=7.02%; N=15.12%.

The infrared spectrum of the product is consistent with the structure:

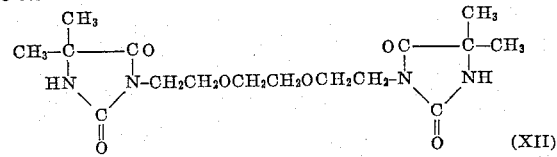
(XII)

(B) A mixture of 64.0 parts (0.5 mole) of 5,5-dimethylhydantoin, 34.6 parts (0.25 mole) of potassium carbonate, and 286 parts of N,N-dimethylformamide is heated to the temperature of reflux and maintained at that temperature for a period of 1½ hours, until the evolution of carbon dioxide has ceased. The mixture is cooled, and 43.75 parts (0.25 mole) of α,α'-dichloro-p-xylene are added. The mixture is heated to a temperature of 120° C. and maintained, with stirring, at that temperature for a period of 18 hours. The cooled mixture is filtered to effect the separation of potassium chloride, the solid is washed with a fresh portion of the solvent medium, and the combined filtrate and washings are poured into 1500 ml. of cold water with vigorous stirring. A white crystalline solid is formed which is isolated by filtration and washed with several portions of cold water. Recrystallization from methanol yields a product having a melting point of 249–252.5° C. Its elemental analysis shows 60.4% carbon and 6.15% hydrogen, corresponding closely to the 60.1% carbon and 6.29% hydrogen calculated for 3,3'-p-xylylene-bis(5,5-dimethylhydantoin).

(C) In a reaction vessel are placed 64.0 parts (0.5 mole) of 5,5-dimethylhydantoin, 34.6 parts (0.25 mole) of potassium carbonate, and 286 parts of N,N-dimethylformamide. The mixture is maintained at the temperature of reflux for a period of 1½ hours while carbon dioxide is evolved, and is then permitted to cool. 1,2-dichloroethane, in the amount of 25.0 parts (0.25 mole), is added, and the mixture is again heated to the temperature of reflux for three hours. After cooling, the solid potassium chloride is removed by filtration, and is washed with a fresh portion of the solvent. The combined filtrate and washings are poured into 1500 parts of cold water and cooled to 0° C. with intermittent stirring for three hours. The crystallized product is removed by filtration, washed with cold water, and dried; it is found to have a melting point of 254–257° C. The product is 3,3'-ethylene-bis(5,5-dimethylhydantoin).

EXAMPLE IV

This example illustrates several techniques for coupling the products of Example II into high molecular weight hydantoin polymers.

(A) The reaction of 3,3'-tetramethylene - bis(5,5 - dimethylhydantoin) with formaldehyde is effected by stirring 31 parts (0.1 mole) of the former Example II–A or B) with 0.3 part of sodium tetraborate decahydrate and 20.8 parts of 37% aqueous formaldehyde solution (representing 0.24 mole) while heating the mixture on a steam bath. Stirring and heating are continued until the mixture has liquefied and resolidified. The solid reaction product is then recrystallized from hot water, whereupon colorless crystals of 3,3'-tetramethylene-bis(5,5-dimethyl-1-hydroxymethylhydantoin) are obtained, which lose formaldehyde above 145° C. Elemental analysis of the product shows 51.6% carbon and 7.13% hydrogen, corresponding closely with the values of 51.9% carbon and 7.03% hydrogen calculated for $C_{16}H_{26}N_4O_6$.

Condensation of the product of the above reaction to a polymeric material is effected by heating with an acid catalyst. A sample of the above dimethylol-bishydantoin is melted with a trace of concentrated sulfuric acid at a temperature of 200° C. in a nitrogen atmosphere. Heating is continued at atmospheric pressure for a period of ½ hour while the temperature rises to 255° C. The pressure is reduced to 1 mm. and heating at a temperature of 260° C. is maintained for a period of 5½ hours. The polymer is dissolved in methylene chloride and reprecipitated by dilution with methanol. The inherent viscosity is found to be 0.45. Repetition of the experiment utilizing a trace of 85% phosphoric acid in place of sulfuric acid produces a polymeric product having an inherent viscosity of 0.78. Heating of a sample of the dimethylol compound with a trace of potassium pyrosulfate for three hours under vacuum at a temperature of 255° C. produces a polymer having an inherent viscosity of 1.75. An additional sample is polymerized in the presence of p-toluene-sulfonic acid by heating at a temperature of 250° C. and at a pressure of 1 mm. for a period of three hours; it exhibits an inherent viscosity of 0.86.

(B) An alternative method of preparing the polymer is as follows:

In 184 parts of concentrated sulfuric acid are dissolved 3.5 parts (0.11 mole) of paraformaldehyde. While maintaining the temperature below about 40° C., 31.0 parts (0.10 mole) of 3,3'-tetramethylene-bis-(5,5-dimethylhydantoin) are stirred into the solution portionwise. The mixture is permitted to stand overnight at room temperature, and is then filtered through a sintered glass funnel to remove any undissolved material. The filtrate is poured slowly into a stirred mixture of ice and water, stirring is continued for one hour while the temperature is held below 10° C., and the solid is removed by filtration through sintered glass funnels. The low polymeric product is washed repeatedly until the washings are neutral to pH test paper. Sodium fusion of a sample of the dried product shows the absence of sulfur. A sample of the product is heated in a test tube at a pressure of about 1 mm. for a period of 1½ hours while the temperature is gradually raised from 220° C. to 240° C.; the resulting polymer exhibits an inherent viscosity, in glacial acetic acid, of 0.61.

(C) A modification of the process of Section B is accomplished by mixing 12.4 parts of 3,3'-tetramethylene-bis-(5,5-dimethylhydantoin) (0.040 mole), 1.3 parts of paraformaldehyde (0.044 mole $CH_2O$) and 12 parts of 37% hydrochloric acid. The resulting mixture, a syrupy liquid containing a small proportion of undissolved solid, is shaken overnight in a stoppered test tube at room temperature. During this treatment it sets to a solid cake, which is stirred into 400 parts of water to form a slurry of fine, white crystalline solid. The solid product is filtered off and washed by repeated slurrying with water until the washings are neutral and free of chloride ion. The dried product is a low polymer with an inherent viscosity of 0.075, as measured in chloroform at 25° C. and 0.5% concentration.

A 1 part portion of the above product is dissolved in 6.7 parts of methylene chloride to which is added 0.0028 part of p-toluenesulfonic acid dissolved in methanol. This polymer solution is evaporated under vacuum in a hot water bath to yield a light, glassy foam. The latter is powdered and heated under vacuum (approx. 2 mm. pressure) in a salt bath for 2¾ hours, during which the bath temperature is raised gradually from 161 to 250° C. The product, a pale brown, tough, glassy foam, has an inherent viscosity of 1.50 in chloroform at 25° C. and 0.5% concentration.

(D) It is also possible to effect the polymerization by a fusion technique. 6.2 parts of 3,3'-tetramethylene-bis(5,5-dimethylhydantoin) (0.020 mole) is melted in a beaker and mixed with 0.015 part of p-toluenesulfonic acid. The mixture is solidified by cooling, ground in a mortar and mixed intimately with 2.0 parts of paraformaldehyde (0.067 mole $CH_2O$). This mixture is heated in an oil bath from 35° C. to 149° C. during 1 hour and held at 149° C. for an additional hour. Much of the excess formaldehyde escapes as vapor and sublimate during this treatment. A solution of the product in acetone is diluted with water to precipitate a white, gummy material. The precipitate is washed several times with water by decantation and dried to constant weight. It is then heated under vacuum (about 2 mm.) from 230 to 245° C. over a 2-hour period. The finished product has an inherent viscosity of 1.52 in chloroform at 25° C., 0.5% concentration.

EXAMPLE V

The techniques of Example IV may be employed to prepare other hydantoin polymers. For example, the products of Example III may be polymerized as follows:

1.85 parts of the product from Example III–A (0.0050 mole) is mixed with 0.33 part of paraformaldehyde (0.011 mole $CH_2$) and 0.005 part of p-toluenesulfonic acid in a test tube. The mixture is placed in an oil bath at 95° C. and heated gradually to 200° C. over a period of 4½ hours. The mixture melts below 110° C., and bubbles of vapor are evolved slowly after the temperature reaches 125° C. A little additional p-toluenesulfonic acid is added midway through the heating period. When the temperature reaches 200° C., the test tube is evacuated with an aspirator, whereupon rapid evolution of vapor occurs. When this subsides, the pressure is further reduced to about 2 mm. with a mechanical pump and the temperature raised gradually from 201 to 245° C. over a period of 1½ hours. The product is a viscous, amber-colored liquid which sets to a glassy solid on cooling. Its inherent viscosity, measured in chloroform at 25° C and 0.5% concentration, is 0.22.

Treatment of the product of Example III–B with borax and aqueous formaldehyde solution, followed by melt polymerization, employing a process analogous with that described in Example IV–A, produces a high molecular weight polymeric compound. Likewise, treatment of the product of Example III–C by the same procedure also leads to a high molecular weight polymer.

EXAMPLE VI

The foregoing examples employ formaldehyde coupling of two hydantoin nuclei previously linked at their 3-positions by various Y groups as a route to high molecular weight polymers. The instant example illustrates carrying out these reactions in the reverse sequence, i.e., forming a high molecular weight polymer by linking, through reaction with various Y groups, pairs of hydantoin nuclei previously formaldehyde-coupled at their 1-positions.

1,1'-methylene-bis(5,5-dimethylhydantoin) is prepared by procedures as described in U.S. Patents 2,417,999 and 2,418,000. 5.36 parts (0.02 mole) of this compound, 3.39 parts (0.04 mole) of sodium bicarbonate, 2.54 parts (0.02 mole) of 1,4-dichlorobutane and 96 parts of N,N-dimethylacetamide are then added to a three-necked flask equipped with a stirrer, reflux condenser, a thermometer, and a heating mantle. The mixture is heated with stirring to a temperature of 130° C for a period of twenty hours. The product is precipitated by pouring the cooled mixture into 400 parts of water with stirring, isolated by filtration, and washed until the washings give a negative test for chloride ion. Titration of the filtrate and washings show the theoretical quantity of chloride ion The dried product exhibits an inherent viscosity of 0.27.

The polyhydantoins of this invention which have a sufficiently high molecular weight are of particular value in the form of shaped articles, as films, fibers, and the like. Films are useful for various protective and wrapping purposes, and fibers may be employed in fabrics of utility in a variety of domestic and industrial applications, either alone or in blends with other filamentary materials.

EXAMPLE VII

A methylene chloride solution containing 31.5% by weight of the polyhydantoin of Example IV having an inherent viscosity of 1.2 is spun through a spinneret having four holes of 0.005 inch diameter. The solution is delivered through the spinneret at the rate of 1.75 ml./min. into a vertical drying column whose temperature varies from 105° C. at the top to 115° C. at the bottom. The yarn is wound up at the rate of 78 yards a minute to give filaments having a round cross-section after air drying. The fibers are drawn up to 4× over the temperature range of from about 80° C. to about 100° C. to produce amorphous and unoriented filaments having a tenacity/elongation/modulus ratio of 1.27/22.4/34.4. The drawn fibers may be crystallized by immersion in o-dichlorobenzene for 1½ hours at room temperature.

EXAMPLE VIII

A sample of the polyhydantoin of Example IV is molded into a plug at a temperature of 225° C and a pressure of 2000 pounds per square inch. The plug is placed in a spinning cell maintained at a temperature in excess of 265° C., and is press-spun at a pressure of 800 pounds per square inch through a single-hole spin-neret, the hole having a diameter of 0.015 inch. The spun yarn is wound up at speeds of up to 650 yards a minute to give amorphous, unoriented filaments. These filaments are drawn to seven times their original length over a hot pin maintained at temperatures ranging from about 80° C. to about 135° C. The drawn fibers exhibit a tenacity/elongation/modulus ratio of 2.5/28/35. Orientation in the fibers increases with increasing draw ratios, but the drawn fibers are still amorphous. By heat-setting the drawn filaments for a period of sixteen hours at a temperature of 127° C., crystalline fibers are obtained.

EXAMPLE IX

A film of the polyhydantoin of Example IV having an inherent viscosity of 1.38 is prepared by casting from a solution of the polymer in chloroform. The film exhibits moduli of 343,900 lbs./in.$^2$ at a temperature of 25° C. and of 18,400 lbs./in.$^2$ at a temperature of 150° C. Its elongation is noted to be 1.8% at a temperature of 25° C. and 86.8% at a temperature of 150° C., and its tenacity is 5800 lbs./in.$^2$ at a temperature of 25° C. and 700 lbs./in.$^2$ at a temperature of 150° C. When measured at 25° C., the film exhibits a volume resistivity of $2.2 \times 10^{12}$ ohm-centimeters/mil, a dielectric constant within the range from 3.43–3.48 when measured at frequencies ranging between $10^2$ and $10^5$ cycles/second, and a dissipation factor ranging between 0.003 and 0.009 when measured at frequencies over the range of $10^2$–$10^5$ cycles/second. The density of the film is found to be 1.257 g./ml., its zero strength temperature is determined to be 232° C., and X-ray examination shows the polymer to exist in an amorphous form. Unilateral orientation of the film may be accomplished by drawing it to 2–3 times its undrawn length over a hot pin maintained at a temperature of 150° C.

It will be understood that the above examples are merely illustrative, and that numerous modifications may be made therein within the skill of those engaged in this art, without departing from the scope of this invention.

I claim as my invention:

1. A linear condensation polymer comprising recurring units of the structure

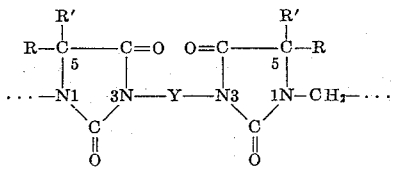

wherein R and R' are members of the group consisting of
 (i) lower alkyl radicals,
 (ii) lower alkyl radicals bearing polar substituents which do not tend to condense with formaldehyde, and
 (iii) alkylene radicals which form with the C-atom in position 5 of the hydantoin nucleus a five- to six-membered saturated ring,
  while Y is a divalent organic radical of the group consisting of
 (iv) the divalent radicals embraced by the three formulas

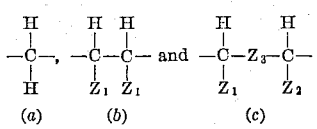

wherein $Z_1$ and $Z_2$ are members of the group consisting of hydrogen and monovalent organic radicals which are free of substituents that are reactive toward hydantoin-ring nitrogen and also of substituents and structures which tend to condense with formaldehyde, while $Z_3$ is a divalent organic radical which is free of the aforesaid substituents and structures, and (v) the divalent radicals embraced by Formulas b and c above but wherein $Z_1$ and $Z_2$ are bonded together to form a divalent organic radical which is free of the aforesaid substituents and structures.

2. A linear condensation polymer as in claim 1, said product having an inherent viscosity greater than 1.0, whereby said polymer is adapted for forming films and filaments by an extrusion process.

3. A linear condensation polymer as in claim 1, said product having an inherent viscosity of not less than 0.03 and not greater than 1.0, whereby said polymer is adapted for use in adhesive formulations, in impregnant formulations for porous materials, and as an intermediate for the synthesis of higher polymers.

4. A linear condensation polymer comprising recurring units of the structure

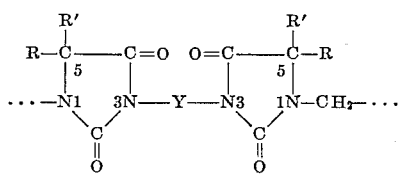

wherein R and R' are members of the group consisting of
 (i) lower alkyl radicals,
 (ii) lower alkyl radicals bearing polar substituents which do not tend to condense with formaldehyde, and
 (iii) alkylene radicals which form with the C-atom in position 5 of the hydantoin nucleus a five- to six-membered saturated ring,
  while Y is a hydrocarbon radical of 1 to 12 C-atoms.

5. A linear condensation polymer comprising recurring units of the structure

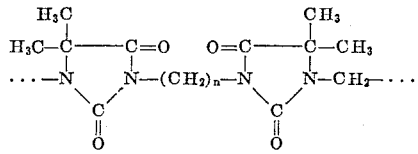

wherein n is an integer from 2 to 6 inclusive.

6. A linear condensation polymer comprising recurring units of the structure

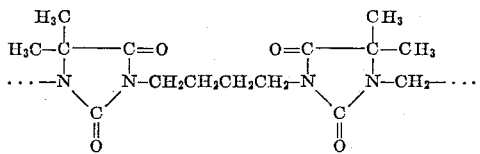

7. The process of producing a linear condensation polymer which comprises condensing, in the presence of an acid acceptor, (a) a methylene-bishydantoin of the formula

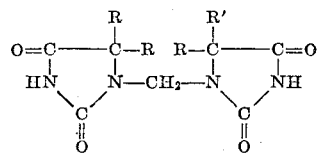

wherein R and R' have the same meaning as in claim 1, with (b) a dihalogen compound of the formula $X_1$—Y—$X_2$, wherein Y has the same meaning as claim 1, while $X_1$ and $X_2$ are halogens selected from the group consisting of chlorine, bromine and iodine.

8. The process of producing a linear condensation polymer which comprises condensing, in a strongly acidic aqueous medium formaldehyde with a bishydantoin compound of the formula

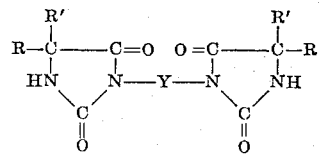

wherein R, R' and Y have the same meaning as in claim 1, whereby to eliminate water between the formaldehyde and said bis compound.

9. The process of producing a linear condensation polymer which comprises reacting formaldehyde at a temperature from about 50° C. to about 90° C. and in the presence of a basic catalyst, with a bishydantoin compound of the formula

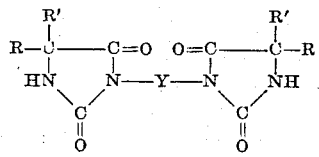

wherein R, R' and Y have the same meaning as in claim 1, whereby to form a dimethylol compound of the formula

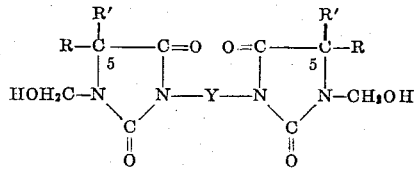

(R, R' and Y having the same meaning as above), isolating and purifying said dimethylol compound and then heating the same at a temperature above 160° C. and up to about 260° C. in the presence of an acid catalyst, whereby to eliminate water and formaldehyde, with formation of a linear polymeric chain.

10. A process which comprises heating, at a temperature of 110° to 300° C. and in the presence of an acid catalyst, a linear condensation polymer, as defined in claim 1, said polymer having an inherent viscosity in the range of 0.03 to 0.10, until a polymer having an inherent viscosity of at least 0.50 is obtained.

11. The process which comprises reacting, in a polar solvent and in the presence of an acid acceptor,
 (I) two moles of a hydantoin compound of the formula

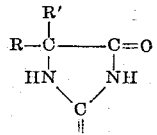

wherein R and R' are members of the group consisting of
 (i) lower alkyl radicals,
 (ii) lower alkyl radicals bearing polar substituents which do not tend to condense with formaldehyde, and
 (iii) alkylene radicals which form with the C-atom in position 5 of the hydantoin nucleus a five- to six-membered saturated ring, with
(II) one mole of an organic dihalide of the formula $X_1$—Y—$X_2$, wherein $X_1$ and $X_2$ are halogens selected from the group consisting of chlorine, bromine and iodine, and Y is a divalent radical of the group consisting of (iv) the divalent radicals embraced by the three formulas

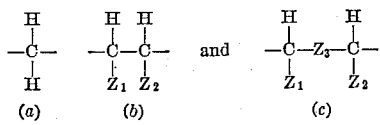

wherein $Z_1$ and $Z_2$ are members of the group consisting of hydrogen and monovalent organic radicals which are free of substituents that are reactive toward hydantoin-ring nitrogen and also of substituents and structures which tend to condense with formaldehyde, while $Z_3$ is a divalent organic radical which is free of the aforesaid substituents and structures, and (v) the divalent radicals embraced by Formulas b and c above but wherein $Z_1$ and $Z_2$ are bonded together to form a divalent organic radical which is free of the aforesaid substituents and structures, whereby to eliminate two moles of hydrogen halide between Reactants I and II.

12. The process which comprises reacting, in a polar solvent and in the presence of an acid acceptor, two moles of 5,5-dimethyl hydantoin with one mole of a dichloroalkane of the formula $Cl-(CH_2)_n-Cl$ wherein $n$ is an integer from 2 to 6 inclusive, whereby to obtain the corresponding 3,3'-alkylene-bis(5,5-dimethylhydantoin).

13. The process which comprises reacting, in a polar solvent and in the presence of an acid acceptor, two moles of 5,5-dimethylhydantoin with one mole of 1,4-dichlorobutane, whereby to obtain 3,3'-tetramethylene-bis(5,5-dimethylhydantoin).

References Cited by the Examiner

UNITED STATES PATENTS 2,417,999   3/1947   Walker _____ 260—309.5
2,418,000   3/1947   Walker _____ 260—309.5

OTHER REFERENCES

Chemical Abstracts, vol. 59, August 1963, 3907e–g (article from Nippon Kagaku Zarshi 83, 318–323 (1962).

Japanese Patent 35/13,927, September 22, 1960 (pages 1–4 relied on). Haga and Sato, Mitsubishi Chemical Company.

WILLIAM H. SHORT, *Primary Examiner.*

H. E. SCHAIN, *Assistant Examiner.*